United States Patent [19]

Goldfarb et al.

[11] 3,968,728
[45] July 13, 1976

[54] CARVING TOOL

[76] Inventors: Adolph E. Goldfarb, 4614 Monarca Drive, Tarzana, Calif. 91356; Erwin Benkoe, 17965 Medley Drive, Encino, Calif. 91316

[22] Filed: Aug. 8, 1975

[21] Appl. No.: 602,997

[52] U.S. Cl. .............................. 90/11 C; 51/240 R; 90/11 R; 144/2 R; 144/286 A; 269/310
[51] Int. Cl.² ........................ B23C 3/00; B23C 1/06
[58] Field of Search ................... 90/11 R, 11 C, 18; 83/477.2, 478, 474; 408/95, 98, 110; 144/2 R, 286 A; 269/310; 33/20 R, 23 H; 51/240 R, 240 GB

[56] References Cited
UNITED STATES PATENTS

| | | | |
|---|---|---|---|
| 993,607 | 5/1911 | Lemon | 83/474 |
| 1,142,923 | 6/1915 | Williams et al. | 269/310 X |
| 1,431,917 | 10/1922 | Antaramian | 51/240 R |
| 1,952,152 | 3/1934 | Wilkie | 269/310 X |
| 2,342,459 | 2/1944 | Dushane | 83/477.2 X |
| 2,435,765 | 2/1948 | Anderson | 83/474 |
| 3,120,136 | 2/1964 | Bieker | 408/98 X |
| 3,587,391 | 6/1971 | Pitts et al. | 90/11 R |
| 3,771,267 | 11/1973 | Fortunski | 51/240 R X |

FOREIGN PATENTS OR APPLICATIONS

| | | | |
|---|---|---|---|
| 1,906,684 | 8/1970 | Germany | 83/477.2 |

*Primary Examiner*—Willie G. Abercrombie
*Assistant Examiner*—W. R. Briggs
*Attorney, Agent, or Firm*—Robert M. Ashen; Robert J. Schaap

[57] ABSTRACT

An apparatus and a method for carving a design in a transparent substrate of the type capable of having substrate material removed by a rotary routing action. A design pattern is applied to one surface of the substrate, as by means of a removable transparent label or the like, which carries lines representing the design pattern. The substrate is located on a table which is, in turn, mounted on and normally biased upwardly from a base housing. When the substrate is disposed upon the table and the table is pushed downwardly toward the base housing, a cutting member will project upwardly a selected distance through an aperture in the table for engaging the substrate in cutting action. The cutting member is rotated by a motor in the base housing. Switch means is provided to automatically energize the motor when the table is lowered but before the cutting member engages the substrate so that the user can use both hands to guide the substrate over the table top. The transparency of the substrate permits it to be guided so that the cutting element will cut into it along the design pattern lines. The motor may be pivotally mounted in the housing so that a second type of cutting element which creates a different type of cut can be positioned to cut the substrate.

20 Claims, 11 Drawing Figures

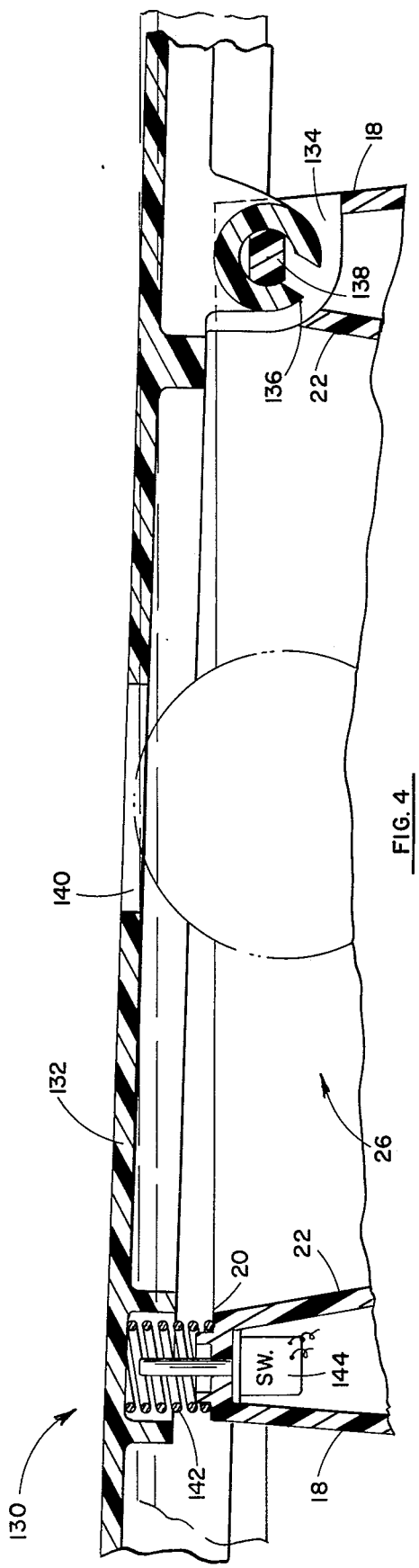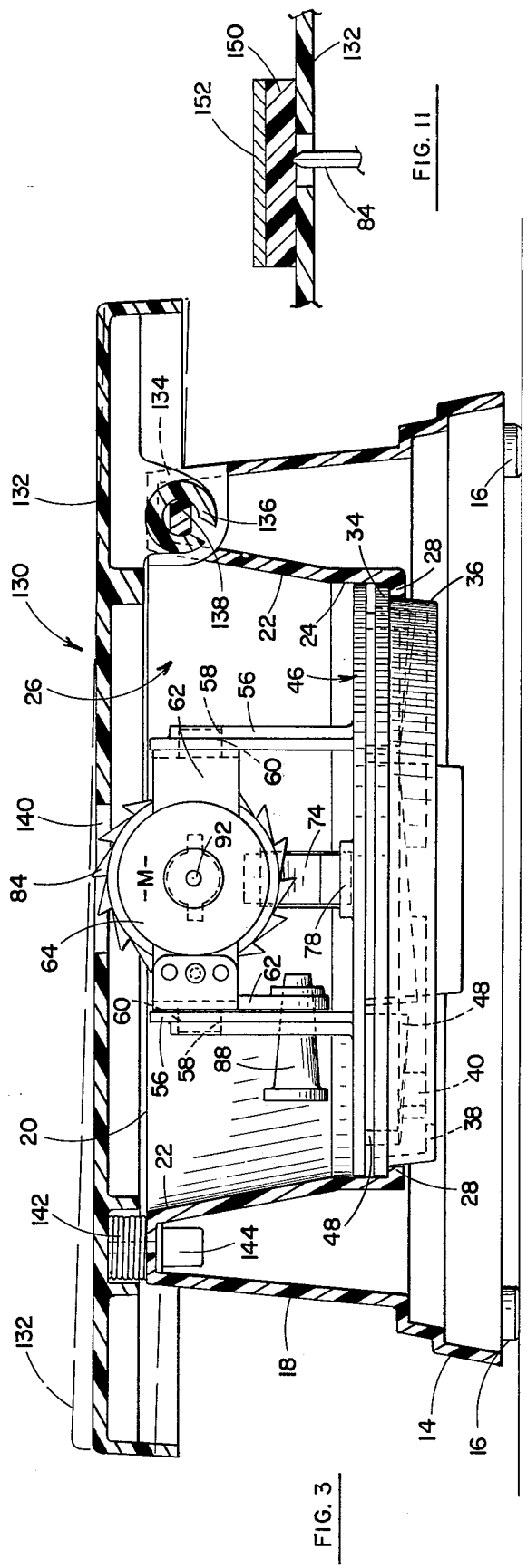

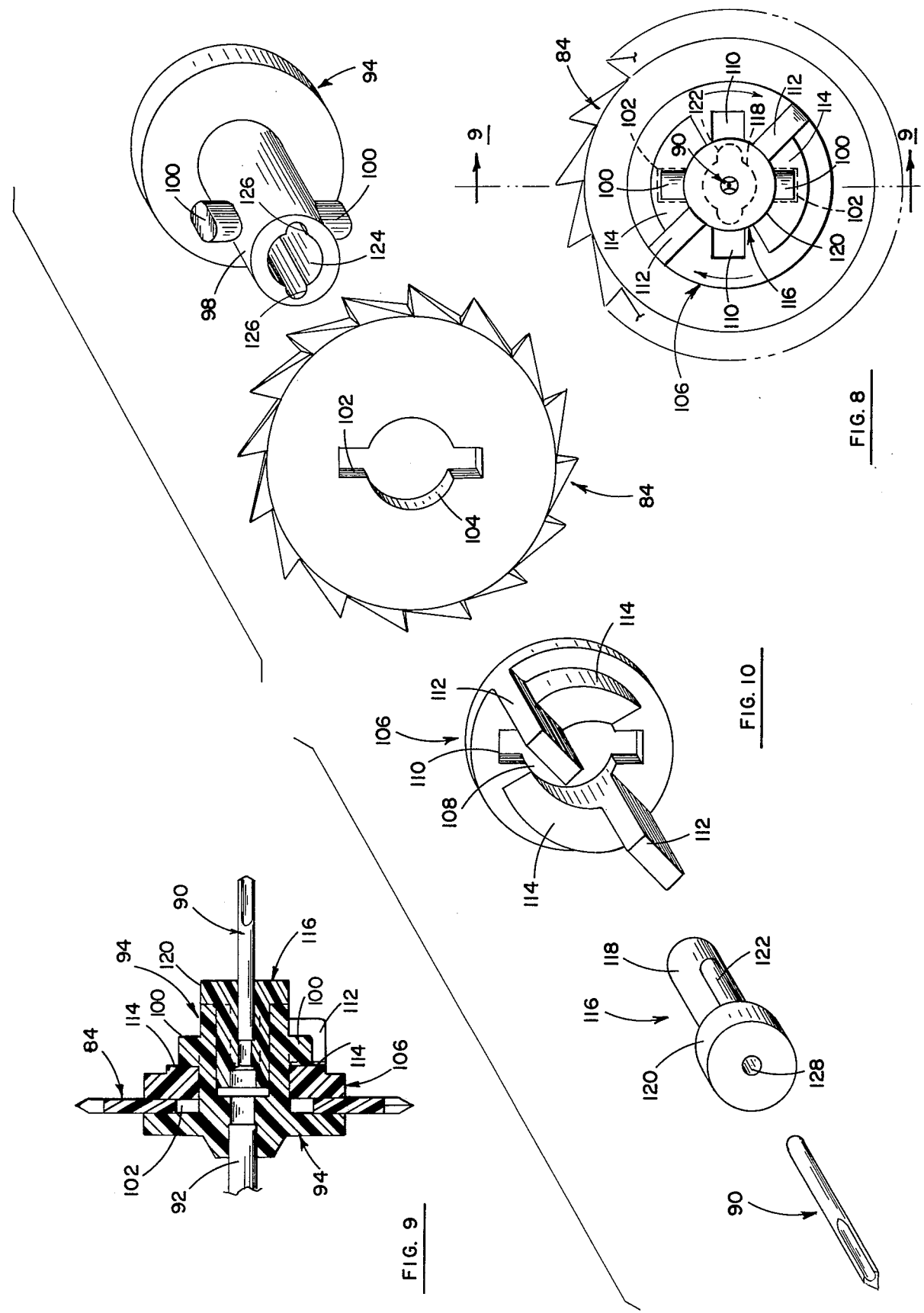

CARVING TOOL

BACKGROUND OF THE INVENTION

This invention relates in general to certain new and useful improvements in carving devices and methods, and, more particularly, to a device and a method for creating a design in a transparent substrate through a routing action.

For many years, glass objects having carving on one or more of the faces thereof have become quite popular and are often referred to as "carved crystal". This carved crystal and similar forms of glass objects having designs carved in the surfaces thereof are prepared in various commercial operations and are commercially available. In addition to those carved crystal objects which are prepared on a mass production operation, there are also various carved crystal objects which are hand carved by an artisan skilled in the art of carving glass and similar substrates.

In recent years, there has been an increased interest in the so-called "do-it-yourself" kits which are also commercially available and enable an individual to perform the carving of a design in a crystal or similar glass or other transparent substrate. Generally, these do-it-yourself kits contain a hand-held cutting device which has a rotatable cutting tip. Typically, this hand-held cutting device includes a hand-grippable housing containing an electric motor and which is battery energized and capable of rotating the cutting tip. In this way, the user of the device can engage the surface of the glass or similar substrate and carve the design as desired in this substrate. However, this form of cutting requires a great degree of skill, and the results achieved by those relatively uninitiated in the art of cutting glass are very poor. Heretofore, there has not been any device or method, either commercially available or even proposed, which permits the relatively unskilled individual to carve glass and similar transparent objects on a relatively efficient basis.

It is therefore the primary object of the present invention to provide a device for cutting transparent substrates through a routing action and which permits the user of the device to move the transparent substrate with respect to a cutting element carried by the device in a precise manner to thereby create a design in a transparent substrate.

It is another object of the present invention to provide a device of the type stated which permits the user of the device to apply a design pattern to a surface of the substrate and thereby move the substrate with respect to a cutting element in accordance with the design pattern.

It is a further object of the present invention to provide a device of the type stated which is capable of having different types of cutting elements on the device to thereby create different forms of design carvings in the surface of the substrate.

It is an additional object of the present invention to provide a device of the type stated which is highly effective in its operation and durable in its construction.

It is another salient object of the present invention to provide a method of creating a design pattern in a transparent substrate by an individual relatively unskilled in the art of carving glass and similar forms of transparent substrates.

With the above and other objects in view, our invention resides in the novel features of form, construction, arrangement and combination of parts presently described and pointed out in the claims.

SUMMARY OF THE DISCLOSURE

The present invention relates to a device and a method for carving a design in a transparent substrate which is capable of having some of the substrate material removed by a routing action. The substrate is essentially a fairly rigid transparent plastic material in a preferred aspect of the present invention, although other transparent materials could be used. In this case, the device includes a base housing having a work receiving table operatively connected to and normally biased outwardly from the housing, and is designed to receive the transparent substrate on its outwardly presented surface.

The base housing carries a motive means in the form of a battery-operated electric motor and in this respect the base housing would include a suitable battery along with the necessary electrical circuitry in order to energize the motor. Moreover, the motor is shiftable between first and second positions. The motor is provided with an outwardly extending drive shaft, and mounted on a hub connected to the drive shaft is a first cutting element which is capable of performing a routing action in the transparent substrate. In essence, this first cutting element operates in the form of a router and rotates about its longitudinal central axis. The cutting element extends through an aperture in the work table when the work table is biased toward the base housing. However, when the work table is biased away from the base housing, the cutting element does not extend through the aperture formed in the work table. Consequently, upon placing the transparent substrate on the work table and pressing downwardly against a spring action which biases the work table outwardly from that base housing, the cutting element will extend through this aperture and engage the transparent substrate.

Upon urging the work table toward the base housing, a microswitch closes and energizes an electrical circuit through the battery to the electric motor, which thereby rotates the cutting element. In this way, the shifting of the work table toward the base housing against its normally biased outward action creates two actions, namely to project the cutting element through the aperture in the work table and to energize the motor which rotates the cutting element.

The motor is capable of being shifted from its first position to its second position, and in this second position, a different cutting element is capable of projecting through the aperture in the work table. This second cutting element adopts the form of a somewhat saw-tooth blade which nevertheless creates a routing action in the form of a saw blade. In like manner, the apparatus of the present invention operates in a similar manner with the second cutting element with respect to the first cutting element.

In accordance with the present invention, a design pattern can be located on one surface of the substrate and which is removable therefrom. Thereafter, the substrate can be located with respect to either the first or second cutting elements so that any one of these cutting elements engages and carves the surface of the substrate in relation to the design pattern to thereby form a carved design on this last-named surface.

In a preferred aspect of the present invention, the design pattern is applied to the outermost surface of the substrate in the form of a transparent member, such as a label, which carries the design pattern and the carving action is created on a second surface which is opposed to and opposite to the first surface. However, other forms of applying the design pattern could be used in accordance with the present invention.

BRIEF DESCRIPTION OF THE DRAWINGS

Figure 1:
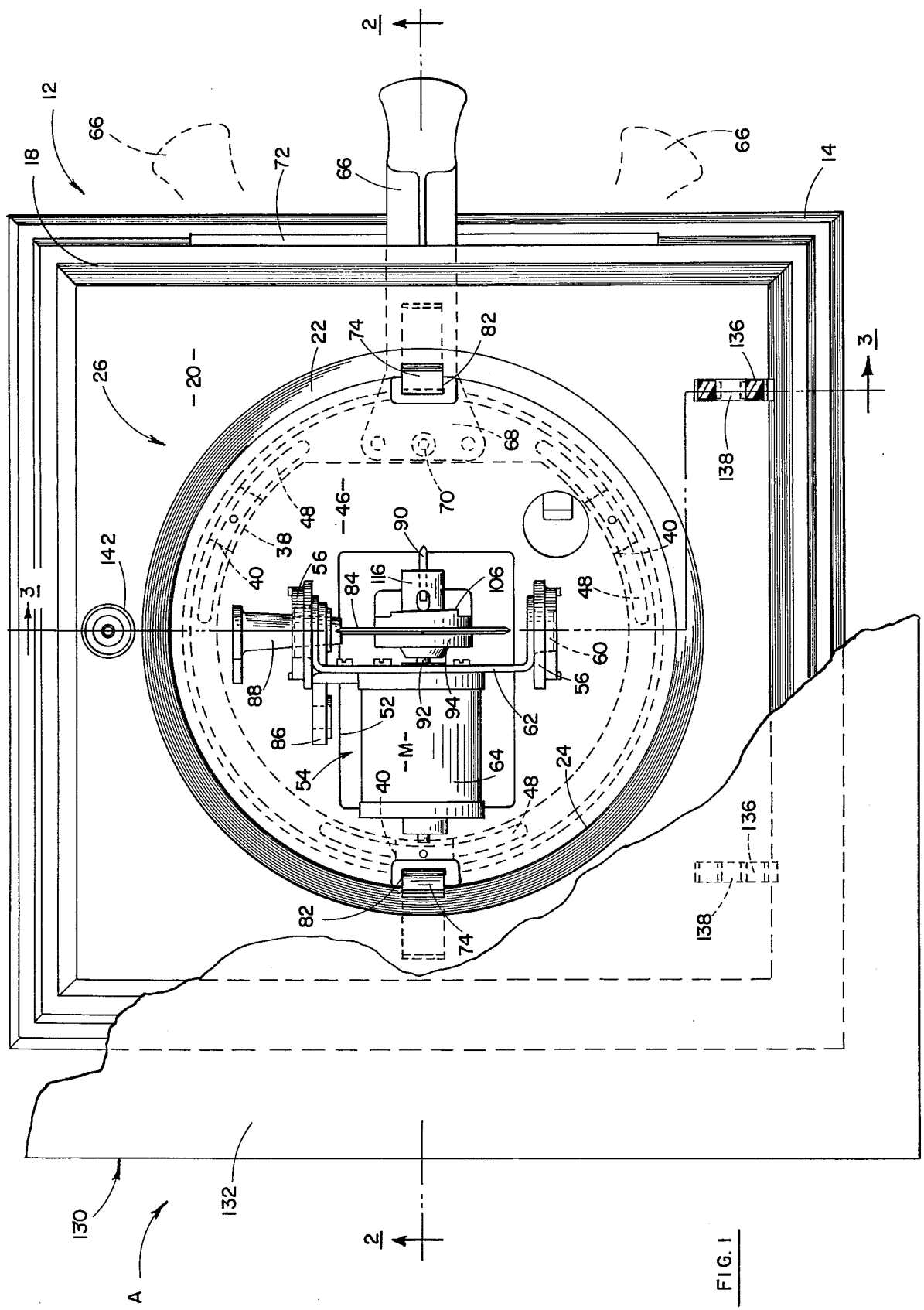
Figure 5:
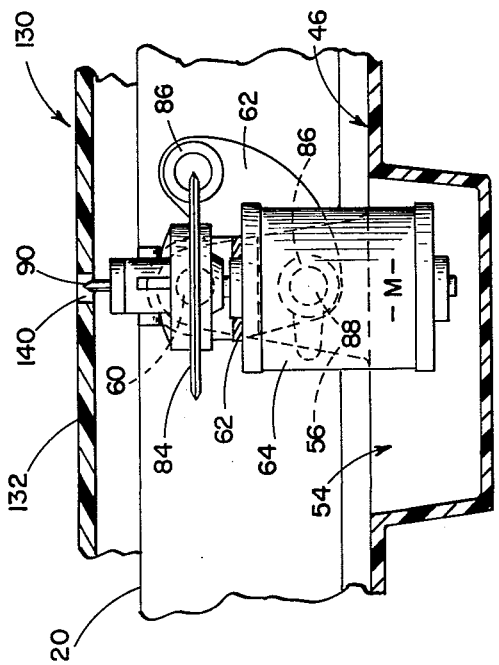
Figure 6:
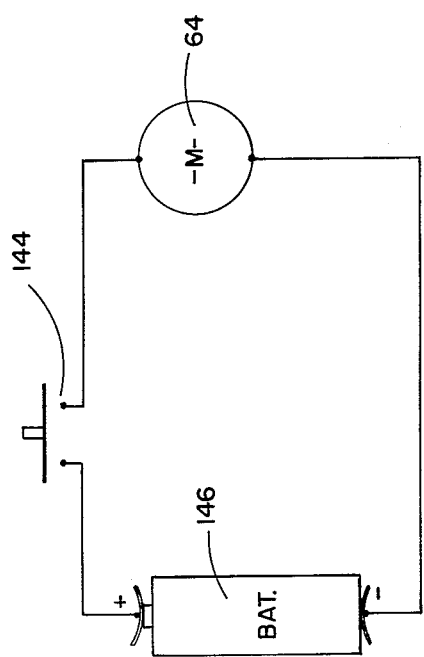
Figure 2:
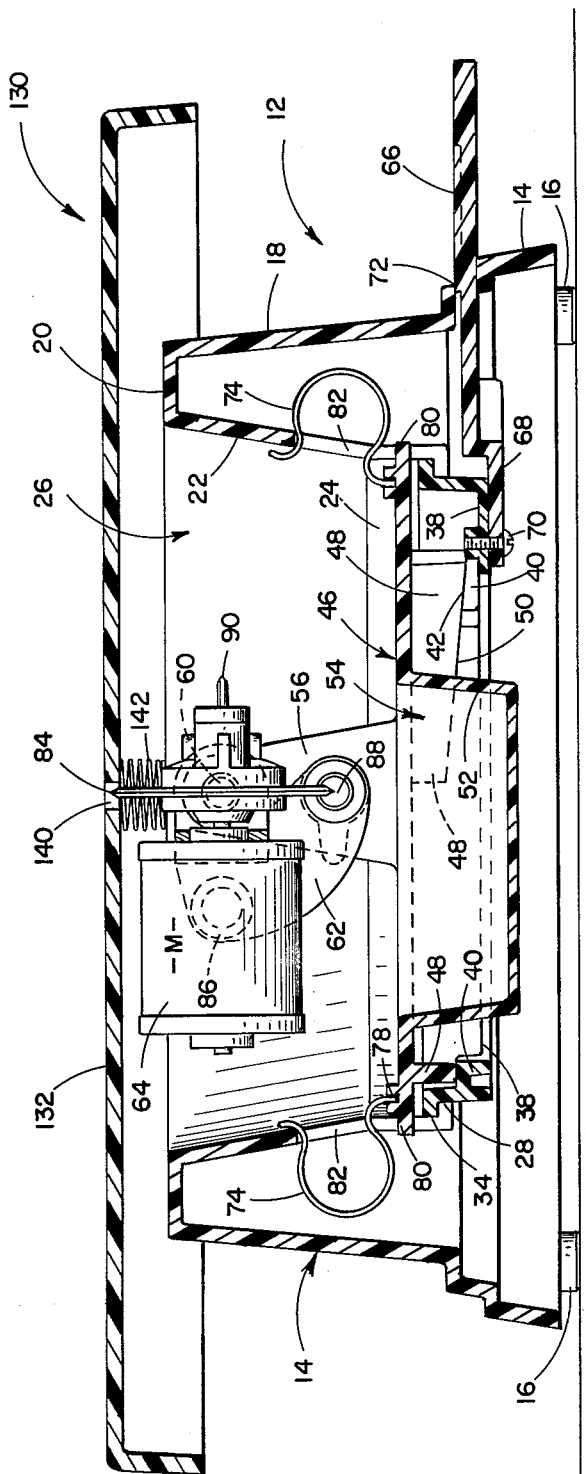
Figure 7:
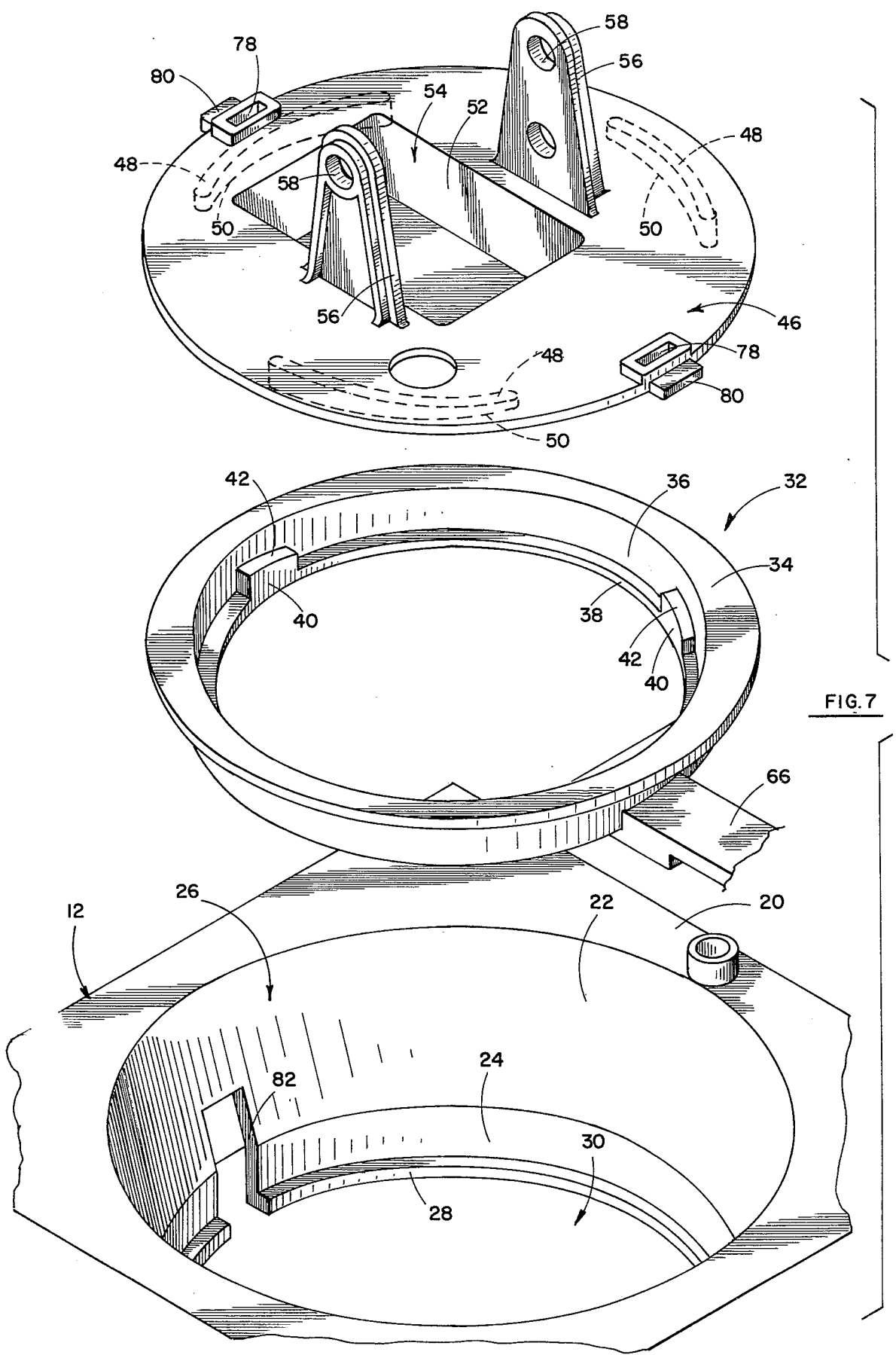

Having thus described the invention in general terms, reference will now be made to the accompanying drawings in which:

FIG. 1 is a top plan view, partially broken away, and partially in phantom lines, and showing a portion of the carving device, constructed in accordance with and embodying the present invention;

FIG. 2 is a vertical sectional view taken along line 2—2 of FIG. 1 and showing a portion of the interior housing and the associated mechanism of the carving device;

FIG. 3 is a vertical sectional view taken along line 3—3 of FIG. 1 and showing an interior portion of the carving device and associated mechanism and which is transverse to the view of FIG. 2;

FIG. 4 is a fragmentary vertical sectional view, similar to FIG. 3, and showing a work table forming part of the apparatus of the present invention in its normally open position;

FIG. 5 is a fragmentary vertical sectional view, somewhat similar to FIG. 2, and showing the motor and associated cutting mechanism rotated from a first position to a second position;

FIG. 6 is a schematic view of an electrical circuit forming part of the apparatus of the present inventon;

FIG. 7 is an exploded perspective view showing various components forming part of the motor mounting means and the base housing with respect to the apparatus of the present invention;

FIG. 8 is a side elevational view of the mounting hub forming part of the cutting element mounting means of the apparatus of the present invention;

FIG. 9 is a vertical sectional view taken along line 9—9 of FIG. 8;

FIG. 10 is an exploded perspective view showing various components forming part of the cutting element mounting means of the present invention; and FIG. 11 is a vertical fragmentary sectional view showing a substrate on a work table forming part of the apparatus of the present invention.

DETAILED DESCRIPTION

Referring now in more detail and by reference characters to the drawings which illustrate practical embodiments of the present invention, A designates a carving apparatus which generally comprises a base housing 12 in the manner as more fully illustrated in FIGS. 1–3 of the drawings. The base housing 12 generally comprises a rectangularly shaped base section 14 having depending feet 16 for supporting the apparatus on a table or similar supporting surface, and these feet 16 may be provided with rubber pads or the like on their undersurface.

Integrally formed with the base section 14 is an upstanding, somewhat rectangularly shaped peripheral side wall 18 which integrally merges into a relatively flat horizontally disposed top wall 20. The top wall 20, in turn, integrally merges into a conically shaped side wall 22 which is tapered downwardly and inwardly and merges into a relatively vertically disposed wall 24 in the form of an upwardly extending ring 28, and which thereby forms an interior cavity 26 within the base housing 12 having an apertured bottom wall 30.

In this respect, the base housing, as well as many of the various other components forming part of the apparatus of the present invention, may be constructed of any of a number of known plastic materials including polyethylene, polystyrene, many of the polyvinyladine polymers and copolymers thereof, and various other moldable plastics which are known in the art. In addition, the base housing and many of the various other components forming part of the apparatus may be formed in any of a number of known plastic forming operations, including thermo-forming, blow molding, injection molding and the like. Nevertheless, it should be also understood that the base housing and/or the other components forming part of the apparatus could be formed of other structural materials such as various known sheet metals including aluminum, steel and the like, and made in a number of well-known sheet metal operations.

Disposed within the interior cavity 26 is a camming ring 32 having an outwardly extending supporting flange 34 which is disposed within the base wall 24. The camming ring 32 is integrally provided with a somewhat vertically disposed ring side wall 36 which integrally merges into a horizontally disposed annular flange 38. Integrally formed with the flange 38 are three upwardly projected cams 40 having inclined camming surfaces 42, and in this respect, each of the cams 40 are located approximately 120° apart from each other around the flange 38. Moreover, it can be observed that the camming faces 42 are inclined downwardly in the counter-clockwise direction, reference being made to FIG. 7 of the drawings.

Also disposed within the internal cavity 26 is a motor mounting plate 46 which is integrally provided on its undersurface with three circumferentially spaced flanges 48 having lower camming surfaces 50 on their under-faces, and which are capable of being engaged by the camming surfaces 42. In this case, the camming surfaces 50 are inclined upwardly with respect to any radial rotation of the plate 46 in the counter-clockwise direction, reference again being made to FIG. 7 of the drawings. In this respect, it can be observed that the plate 46 is provided with a trough-forming wall 52 which forms a motor receiving recess 54 in a manner to be hereinafter described in more detail.

Also carried by the mounting plate 46 is a pair of upstanding motor mounting flanges 56 which are provided with aligned apertures 58. These apertures 58 receive mounting pintles 60 which are carried by a motor mounting bracket 62 and which, in turn, carries a conventional battery operated electrical motor 64.

Rigidly secured to the camming ring 32, in the manner as illustrated in FIGS. 1, 2 and 7, is a lever arm 66 which is provided at its inner end with an enlarged mounting flange 68 secured to the camming ring 32 by means of screws 70. The lever arm 66 extends outwardly from the base section 14 through an enlarged elongate horizontally disposed slot 72 formed in the base section 14. In this way, it can be observed that since the lever arm 66 is secured to the camming ring 32, shiftable movement of the lever arm 66 in a horizontal direction within the slot 72 will cause the camming ring 32 to rotate. Inasmuch as the cams 48 on the plate 46 are located to bear against the cams 40 on the camming ring 32, rotation of the camming ring 32 will cause vertical shiftable movement of the motor mounting plate 46. In this respect, it can be observed that the cams 48 have their camming surfaces 50 which bear against the camming surfaces 42 of the cams 40. Consequently, when the lever 66 is shifted in one direct, the camming ring 32 will rotate in order to permit the motor mounting plate 46 to raise, and when shifted in the opposite direction, the mating camming surfaces 50 and 42 will permit the motor mounting plate 46 to lower. In this way, it is possible to adjust the position of a cutting element in a manner as hereinafter described in more detail.

Rotation of the motor mounting plate 46 with the camming ring 32 is prohibited by means of somewhat U-shaped clip-springs 74 which fit within apertures 82 formed within the cylindrically shaped side wall 22, as illustrated in FIG. 2 of the drawings. The upper end of these clip-springs 74 bear against the side wall 22 and the lower end of each of these clip-springs 74 fits within locking slots 78 formed within the motor mounting plate 46, in the manner as more fully illustrated in FIGS. 2 and 7 of the drawings. In this way, the motor mounting plate 46 is inhibited against rotation with shiftable movement of the lever arm 66 in a horizontal plane, but nevertheless is capable of a vertical shifting movement when the lever arm is shifted in a horizontal direction. Moreover, the motor mounting plate 46 is provided with outwardly extending locking tabs 80 which extend into vertically disposed slots 82 formed within the cylindrical side wall 22, in the manner as more fully illustrated in FIG. 7 of the drawings. In this way, rotation of the motor mounting plate 46 is further inhibited.

FIG. 1 of the drawings illustrates a cutting mechanism in the form of sawtooth blade 84 operatively mounted with respect to the motor 64 in a manner to be hereinafter described in more detail. By reference to FIG. 2 of the drawings, it can be observed that when the motor 64 is in this position, the sawtooth blade 84 will extend through a top plate, to be hereinafter described in more detail. As indicated above, the motor 64 is mounted on a motor mounting bracket 62. This bracket 62 includes an outwardly extending flange 86 which is capable of being secured by a locking pin 88 to the bracket 56 which is mounted on the motor mounting plate 46. In this way, it can be observed that the bracket 62, and hence the motor 64, is capable of being shifted from the first position, as illustrated in FIG. 2 of the drawings, to a second position, as illustrated in FIG. 5 of the drawings, where a second cutting element 90, in the form of a router bit, can also be used with the motor 64. In each case, it can be nevertheless observed that each of the cutting elements, namely the sawtooth blade 84 and the routing bit 90, perform a routing action within a substrate. FIG. 5 illustrates the position of the motor 64 in this second position where the router bit extends through the apparatus in a manner as is hereinafter described in more detail.

The means for mounting the cutting elements 84 and 90 is more fully illustrated in FIGS. 8, 9 and 10 of the drawings, and in this respect, it can be observed that the motor 64 is provided with an outwardly extending drive shaft 92 and mounted on the outer end of the drive shaft 92 is a mounting hub 94. Carried by the mounting hub 94 is the sawtooth cutting element 84 having a central aperture 104. The hub 94 is provided with an outwardly extending mounting boss 98, which fits within the aperture 104, as is more fully illustrated in FIGS. 8 and 10 of the drawings.

The outwardly extending mounting boss 98 is provided with radially extending locking tabs 100 which pass through the recesses 102 formed in the aperture 104, the latter being located within the cutting element 84, in the manner as illustrated in FIG. 10 of the drawings. The cutting element 84 is retained on the boss 98 of the hub 94 by means of a locking ring 106 which is similarly provided with an aperture 108 extendible over the boss 98 and a pair of recesses 110 which are capable of passing over the locking tabs 100.

The locking ring 106 is also provided with a pair of opposed outwardly extending and essentially parallel operating flanges 112 and a pair of outwardly extending camming ring segments 114 in the manner as illustrated in FIG. 10 of the drawings. In this case, it can be observed that by applying rotating force to the flanges 112 the camming ring segments 114 are caused to bear against the tube 100 exerting axial pressure against the side face of the cutter 84, which is frictionally secured between members 94 and 106 whereby the cutter 84 may be driven in rotation. Additionally, there is provided a collet member 116, which is provided with a shank 118 having an enlarged head 120. The shank 118 is further provided with alignment projections 122 which fit within matching recesses 126 within the central bore 124 formed within the mounting boss 98 of the member 94. The shank of the cutting element 90 press fits within a central aperture 128 formed within the collet 116 to enable rotation therewith.

In accordance with the above-outlined construction, it can be observed that the cutting element 84 can easily be removed by simple removal of the collet 116 and thereafter unlocking removal of the retaining ring 106 and hence the cutting blade 84. Thereafter, another cutting blade which also rotates on the hub 98 can be substituted for the cutting element 84.

It can be observed that the cutting element 90 extends within the aperture 128 formed within the collet 116. In this way, the cutting element 90 could also be easily substituted for another similar cutting element 90.

Pivotally mounted on one side wall portion of the peripheral side wall 18 is a work table 130 which is provided with a relatively flat substrate receiving surface 132. The work table 130 is provided with a pair of depending flanges 134 which carry a locking ring 136, the latter of which fits about a retaining pin 138, extending along the last named portion of the side wall section 18. In this way, the work table 130 is pivotal with respect to the peripheral side wall 18. Moreover, the work table is provided with an aperture 140 in which the cutting element 84 may extend through and thereby engage a substrate 150. The work table is shown in the uppermost position as illustrated in FIG. 4, and in the lowermost position or in the cutting position as illustrated in FIG. 3 of the drawings. It can be observed that the cutting element 84 extends through the aperture 140, whereas in the upper position, as illustrated in FIG. 4, the cutting element does not extend through the aperture 140. In this way, when a plastic or similar substrate 150 is laid upon the surface 132 of the work table 130, and when the work table is urged downwardly, the cutting element 84 will extend through the aperture 140 and engage the substrate in order to form a design pattern on the under surface of the substrate when substrate 150 is moved on the work surface 132.

In accordance with the above, it can be observed that the amount of the cutting element 84 which projects through the aperture 140 can be adjusted by movement of the lever arm 66. Consequently, a deeper or a shallower cut may be formed within the substrate. Moreover, by rotating the motor retaining bracket 62, and hence the motor 64, through a 90° arc, it is possible to project the cutting element 90 through the aperture 140 and thereby create a different form of routed surface in the substrate. Again, it can be observed that the degree of projection of the cutting element 90 through the aperture 140 can also be adjusted by lever arm 66.

Mounted on the peripheral side wall section 18 opposite to that section which pivotally mounts work table 130 is a spring 142 which normally biases the work table 130 to the upward position, that is the position where the cutting element does not extend through the aperture 140. Consequently, when a substrate is placed upon the work surface 130, and the work table 130 is biased downwardly, against the action of a compression spring 142, the cutting element will project through the aperture 140 and engage the substrate.

A microswitch 144 is mounted within the side wall 18, in the manner as illustrated in FIG. 3 of the drawings. This microswitch is electrically connected to the motor 64 in order to energize the motor 64 when the work table 130 is urged downwardly toward its lowermost position as illustrated in FIG. 3 of the drawings. The motor 64 is connected through the microswitch 144, through a conventional battery 146, such as a conventional DC drycell battery in a simple series circuit, in the manner as illustrated in FIG. 6 of the drawings. Thus, it can be observed that when the work table 130 is urged downwardly against the action of the compression spring 142, the switch 144 will be closed and thereby complete a circuit to the motor 64. In this way, it can be observed that by shifting the work table downwardly about the hinge point 138, the cutting element will project through the aperture 140 and in addition the circuit will be completed to the motor 64 to thereby rotate the cutting element.

In this respect, the microswitch 144 is so located that the motor 64 will be energized and the cutting elements 84 or 90 will begin rotation prior to the work table 130 reaching its lowermost position so that rotation of the cutting element occurs prior to engagement with the substrate. In this same respect the position of the cutting element is adjusted by the arm 66 and that the cutting element bottoms out in engagement with the substrate, which determines the depth of cut. The cutting element does not extend all the way through the substrate and just performs a routing action in one flat surface of the substrate. Consequently, the cutting element rotates in the same manner as a router bit, similar to that of a dentist's burr. Moreover, in order to achieve different cuts in the surface of the substrate, it is possible to have the cutting element either vertically disposed or otherwise somewhat angeled with respect to the vertical and hence with respect to the flat plane of the substrate.

Further, by reference to FIG. 11, it can be observed that the substrate previously mentioned is designated by reference numeral 150 and which is provided with a decal 152 on its upper surface. This decal may adopt a form of label which contains guidelines thereon. Thus, the user of the apparatus may move the substrate 150 in accordance with the lines on the decal 152 so that the cutting element 84, or otherwise the cutting element 90, engages the substrate 150 in the region of the lines thereby creating the design pattern. In this respect, it can be observed that the user of the apparatus can merely stop the carving action by removing any pressure against the work table 130. In this way, the spring 142 will bias the work table 130 to the upward position to disengage the cutting element 84 and de-energize the motor 64. When it is further desired to continue along with the carving action, the user of the apparatus merely presses against the substrate 150 to bias the work table 130 to the downwardly position and will cause projection of the cutting element 84, or otherwise cutting element 90, through the aperture 140 and, in addition, energize the motor 64 to initiate the carving action.

Thus there has been illustrated and described a unique and novel apparatus and method for creating designs in a transparent substrate which therefore fulfills all of the objects and advantages sought therefor. It should be understood that many changes, modifications, variations, and other uses and applications will become apparent to those skilled in the art after considering this specification and the accompanying drawings. Therefore, any and all such changes, modifications, variations, and other uses and applications will be deemed to be covered by the invention which is limited only by the following claims.

We claim:

1. A method of carving a design in a transparent substrate capable of having material removed by rotary routing action, said method comprising:
   a. creating a design pattern on a surface of said transparent substrate,
   b. locating said substrate with an inward face disposed on a support which is relatively movable toward and away from a rotatable cutting element, the support having an opening therethrough for the cutting element to pass through and engage the substrate inward face,
   c. effecting relative movement of the support toward the cutting element so that said inward face of said substrate is engaged by said cutting element,
   d. effecting rotation of said cutting element when said relative movement of the support toward the cutting element occurs but prior to the cutting element engaging the substrate inward face, and
   e. moving the substrate over the support with respect to the cutting element and in relation to said design pattern to thereby form a carved design on said substrate inward surface in accordance with said design pattern.

2. The method of carving a design of claim 1 further characterized in that said method comprises moving said substrate in registry with said design pattern.

3. The method of carving a design of claim 1 further characterized in that said method comprises applying said design pattern to a first surface of said substrate in the form of a removable transparent member carrying said design pattern, and forming said carved design in a second surface of said substrate.

4. The method of carving a design of claim 1 further characterized in that said method comprises locating said substrate on a flat table member and urging said substrate toward said table member against a biasing force applied to said table member to cause engagement between said substrate and cutting element.

5. The method of carving a design of claim 1 further characterized in that said substrate is formed of a fairly rigid plastic material.

6. The method of carving a design of claim 1 further characterized in that said method comprises placing a second cutting element in relationship to said substrate and in place of said first named cutting element to create a different type of cutting action in said substrate.

7. A device for forming a routed design in a transparent substrate, said device comprising:
   a. base means,
   b. a work receiving member having an outwardly facing surface for the inward face of a transparent substrate thereon,
   c. means between said work receiving member and said base means for affording relative movement of said work receiving member and said base member toward and away from one another,
   d. a rotatable cutting element capable of cutting a routed design in said substrate inward face projecting outwardly from said base means and capable of projecting through said work receiving member and said surface to engage the substrate inward face when said work receiving member is moved toward said base means,
   e. motive means operatively associated with said base means and being operatively connected to said cutting element to rotate said cutting element in a routing action, and
   f. interlock means operatively associated with said work receiving member and motive means to cause both energization of said motive means and rotation of said cutting element when said work receiving member is moved toward said base means, but before said cutting element makes any substantial engagement with the substrate inward face.

8. The device of claim 7 further characterized in that said work receiving member is biased upwardly from said base means and said surface is a relatively flat upwardly presented surface.

9. The device of claim 7 further characterized in that said substrate is provided with a design pattern on a surface thereof, so that said substrate can be moved on said surface in such manner that the cutting element causes a routing action in relation to said design pattern.

10. The device of claim 9 further characterized in that said design pattern is located on a removable element applied to a first surface on the substrate and said substrate is located on said work receiving surface to have a design pattern routed in a second surface of said substrate opposed to said first surface.

11. The device of claim 7 further characterized in that said motive means is a battery powered electric motor, and said interlock means comprises a limit switch actuated by said work receiving member when urged toward said base means.

12. The device of claim 11 further characterized in that said base means comprises an outer housing having a central chamber therein and said motive means is located in said central chamber.

13. The device of claim 7 further characterized in that said motive means is shiftable from a first position to a second position and said first named cutting means connected to said motive means is shiftable therewith, and a second cutting means is connectable to said motive means and is capable of projecting through said work receiving surface when motive means is in said second position.

14. A system for forming a routed design in a transparent substrate, said system comprising:
   a. base means,
   b. a work receiving member having a surface capable of receiving said substrate,
   c. means biasing said work receiving member outwardly away from said base means,
   d. a first cutting element capable of cutting a design in said substrate projecting outwardly from said base means and capable of projecting through said work receiving member and said surface when said member is urged toward said base means,
   e. motive means operatively associated with said base means and being operatively connected to said first cutting element to move said cutting element in a routing action,
   f. means pivotally mounting said motive means to said base means so that motive means is capable of being shifted from a first position where said first cutting element projects through said work receiving surface to a second position,
   g. and a second cutting element operatively mounted with respect to said motive means and capable of projecting through said work surface when said motive means is shifted to the second position.

15. The system of claim 14 further characterized in that said first position is substantially perpendicularly located with respect to said second position.

16. The system of claim 14 further characterized in that said first cutting element has a different type cutting surface than said second cutting element and creates a different type of routing action than said second cutting element.

17. The system of claim 16 further characterized in that said first cutting element rotates in perpendicular relationship to the surface of the substrate in which said routing action occurs, and that said second cutting element rotates in a plane relatively parallel to said last named surface.

18. The system of claim 14 further characterized in that said system comprises interlock means operatively associated with said work receiving member and motive means to cause energization of said motive means and movement of said cutting element when said work receiving member is urged toward said base means.

19. A method of carving a design in a transparent substrate having first and second opposed flat surfaces and capable of having material removed by rotary routing action, said method comprising:
   a. creating a removable design pattern on a first flat surface of said transparent substrate,
   b. locating said substrate with a second face inwardly disposed on a support which is relatively movable toward and away from a rotatable cutting element, the support having an opening therethrough for the cutting element to pass through and engage the inwardly disposed flat second face of the substrate,
   c. effecting relative movement of the support toward the cutting element so that said inward face of said substrate is engaged by said cutting element,
   d. effecting rotation of said cutting element such that said cutting element engages the second flat face of the substrate in a cutting action,
   e. moving the substrate over the support with respect to the cutting element and in relation to said design pattern to thereby form a carved design on said second flat face of said substrate in accordance with said design pattern, and
   f. removing the design pattern.

20. The method of carving a design of claim 19 further characterized in that said method comprises moving said substrate in registry with said design pattern.

* * * * *